(12) United States Patent
Iliadis et al.

(10) Patent No.: US 9,430,697 B1
(45) Date of Patent: Aug. 30, 2016

(54) METHOD AND SYSTEM FOR FACE RECOGNITION USING DEEP COLLABORATIVE REPRESENTATION-BASED CLASSIFICATION

(71) Applicant: TCL RESEARCH AMERICA INC., San Jose, CA (US)

(72) Inventors: Michael Iliadis, San Jose, CA (US); Armin Kappeler, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 14/791,388

(22) Filed: Jul. 3, 2015

(51) Int. Cl.
*G06K 9/00* (2006.01)
*G06K 9/66* (2006.01)
*G06K 9/46* (2006.01)
*G06F 17/30* (2006.01)
*G06T 7/00* (2006.01)

(52) U.S. Cl.
CPC ..... *G06K 9/00288* (2013.01); *G06F 17/30244* (2013.01); *G06K 9/00221* (2013.01); *G06K 9/4609* (2013.01); *G06K 9/4671* (2013.01); *G06K 9/66* (2013.01); *G06T 7/0042* (2013.01); *H04N 2201/3274* (2013.01)

(58) Field of Classification Search
CPC .............. G06K 9/66; G06K 9/00288; G06K 9/00248; G06K 9/4609; G06K 9/6256; G06K 9/6267; G06K 9/00281; G06K 9/00221; G06K 9/00295; G06K 9/00268; G06K 9/4671; G06F 17/30424; G06F 17/30442; G06F 17/30598; G06F 17/30657; G06F 17/30244; G06F 17/30256; G06Q 50/265; H04N 2201/3274; H04N 1/00331; G06T 7/0042; G06T 2207/30201
See application file for complete search history.

(56) References Cited

U.S. PATENT DOCUMENTS

| | | | | |
|---|---|---|---|---|
| 5,161,204 A | * | 11/1992 | Hutcheson | ......... G06K 9/00221 382/157 |
| 5,274,714 A | * | 12/1993 | Hutcheson | ......... G06K 9/00221 382/157 |
| 5,642,431 A | * | 6/1997 | Poggio | .............. G06F 17/30259 235/380 |
| 6,466,685 B1 | * | 10/2002 | Fukui | ................. G06K 9/00288 382/115 |
| 6,496,594 B1 | * | 12/2002 | Prokoski | .............. A61B 5/1176 382/118 |

(Continued)

FOREIGN PATENT DOCUMENTS

| CN | 103761507 A | 4/2014 |
|---|---|---|
| CN | 104392231 A | 3/2015 |

*Primary Examiner* — Manav Seth
(74) *Attorney, Agent, or Firm* — Anova Law Group, PLLC

(57) ABSTRACT

The present invention provides a face recognition method. The method includes obtaining a plurality of training face images which belongs to a plurality of face classes and obtaining a plurality of training dictionaries corresponding to the training face images. A face class includes one or more training face images. The training dictionaries include a plurality of deep feature matrices. The method further includes obtaining an input face image. The input face image is partitioned into a plurality of blocks, whose corresponding deep feature vectors are extracted using a deep learning network. A collaborative representation model is applied to represent the deep feature vectors with the training dictionaries and representation vectors. A summation of errors for all blocks corresponding to a face class is computed as a residual error for the face class. The input face image is classified by selecting the face class that yields a minimum residual error.

18 Claims, 6 Drawing Sheets

(56) References Cited

U.S. PATENT DOCUMENTS

| | | | |
|---|---|---|---|
| 7,139,411 B2* | 11/2006 | Fujimura | G06K 9/00362 250/330 |
| 7,184,602 B2* | 2/2007 | Cohen | G06K 9/00248 348/E7.081 |
| 7,551,755 B1* | 6/2009 | Steinberg | G06K 9/00228 340/5.53 |
| 7,587,068 B1* | 9/2009 | Steinberg | G06K 9/00208 340/5.53 |
| 8,027,521 B1* | 9/2011 | Moon | G06K 9/00288 382/118 |
| 8,396,262 B2* | 3/2013 | Aisaka | G06K 9/00261 340/5.83 |
| 8,406,525 B2* | 3/2013 | Ma | G06K 9/00275 382/159 |
| 8,897,504 B2* | 11/2014 | Steinberg | G06K 9/00208 382/118 |
| 9,122,931 B2* | 9/2015 | Peng | G06T 11/60 |
| 9,176,987 B1* | 11/2015 | Peng | G06F 17/30253 |
| 9,275,309 B2* | 3/2016 | Iliadis | G06K 9/66 |
| 2003/0161504 A1* | 8/2003 | Inoue | G06K 9/00221 382/115 |
| 2004/0091137 A1* | 5/2004 | Yoon | G06K 9/00268 382/118 |

\* cited by examiner

METHOD AND SYSTEM FOR FACE RECOGNITION USING DEEP COLLABORATIVE REPRESENTATION-BASED CLASSIFICATION

FIELD OF THE DISCLOSURE

The present disclosure relates to the field of image processing technologies and, more particularly, relates to face recognition techniques.

BACKGROUND

With the development of computation systems and image processing technologies, face recognition are becoming widely used in security systems, interactive video applications, image editing and archiving applications, and computer vision applications, etc. For example, video face recognition has been driven by its huge potential in developing applications in many domains including video surveillance security, augmented reality, automatic video tagging, medical analysis, quality control, and video-lecture assessment.

Face Recognition (FR) with illumination, block occlusion and disguise variations has been a research topic in computer vision. Current methods in FR suggest that frontal views of human faces can be represented as a linear combination of training-set faces. This representation can be used for classification or identification.

Simple regression models such as regularized least squares may provide reasonable performance when faces are clean and un-occluded. However, in more challenging cases (e.g., severe occlusion), robust regression models need to be utilized.

In face recognition methods based on robust statistics, error distribution between the test sample and the dictionary faces is implemented to be different from Gaussian and, thus, better representation vectors can be obtained. One approach is to detect outlier pixels (e.g., occluded pixels) in the face by regularized robust coding (RRC). In RRC, the residual term is described by a robust M-Estimator and obtained by solving an iterative reweighted least squares problem. Another approach is to iteratively correct distorted faces using robust statistics. Other options may include describing the residual by the robust correntropy induced metric, or use a nuclear norm regression model to describe the error distribution.

Improvements in face recognition rates may be achieved with block-based sparse representation based classification (SRC). The basic idea is to partition the face image into blocks and perform SRC identification by averaging the residuals from each block. Thus, more representation vectors are estimated to enhance identification performance. For example, in a relaxed collaborative representation (RCR) method, the similarity and distinctiveness of the representation vectors from each block is exploited by minimizing the variance among them. For another example, in a multi-task joint sparse representation based classification, multiple input features from the whole face are used instead of multi-block pixel intensities. However, these block-based representation methods detects similarities based on pixel intensities of the blocks, which may not fully describe characteristics of the blocks and thus are not very robust in various applications.

Further, accuracy and performance of existing methods in challenging face recognition cases still need to be improved.

Therefore, it is desired to provide face recognition techniques for faces having frontal views with illumination, block occlusion and disguise variations. The disclosed method and system are directed to solve one or more problems set forth above and other problems.

BRIEF SUMMARY OF THE DISCLOSURE

One aspect of the present disclosure provides a face recognition method. The method includes obtaining a plurality of training face images which belongs to a plurality of face classes, wherein a face class includes one or more training face images and represents an identification of the one or more training face images. Further, a plurality of training dictionaries corresponding to the plurality of training face images are obtained. The plurality of training dictionaries include a plurality of deep feature matrices. The method further includes obtaining an input face image. The input face image is partitioned into a plurality of blocks, whose corresponding deep feature vectors are extracted using a deep learning network. A collaborative representation model is applied to represent the deep feature vectors with the training dictionaries and representation vectors. A summation of errors for all blocks corresponding to a face class is computed as a residual error for the face class, wherein an error for a block exists between a feature vector corresponding to the block and the collaborative representation model of the block corresponding to the face class. The input face image is classified by selecting the face class that yields a minimum residual error. Further, the resultant face class of the input face image is presented.

Another aspect of the present disclosure provides a face recognition system based on a computing device. The system includes a storage module, an acquisition module, a computation module and an output module. The storage module is configured to a plurality of training face images which belongs to a plurality of face classes, wherein a face class includes one or more training face images and represents an identification of the one or more training face images. The storage module is further configured to store a plurality of training dictionaries corresponding to the plurality of training face images. The plurality of training dictionaries include a plurality of deep feature matrices. The acquisition module is configured to obtain an input face image. The computation module is configured to partition the input face image into a plurality of blocks; extract corresponding deep feature vectors of the plurality of blocks of the input face image using a deep learning network; and apply a collaborative representation model to represent the deep feature vectors with the training dictionaries and representation vectors. The computation module is further configured to compute residual errors for the face classes and classify the input face image by selecting the face class that yields the minimal residual error. A residual error for a face class is a summation of errors for all blocks corresponding to the face class, wherein an error for a block exists between a feature vector corresponding to the block and the collaborative representation model of the block corresponding to the face class. Further, the output module is configured to present the face class of the input face image.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
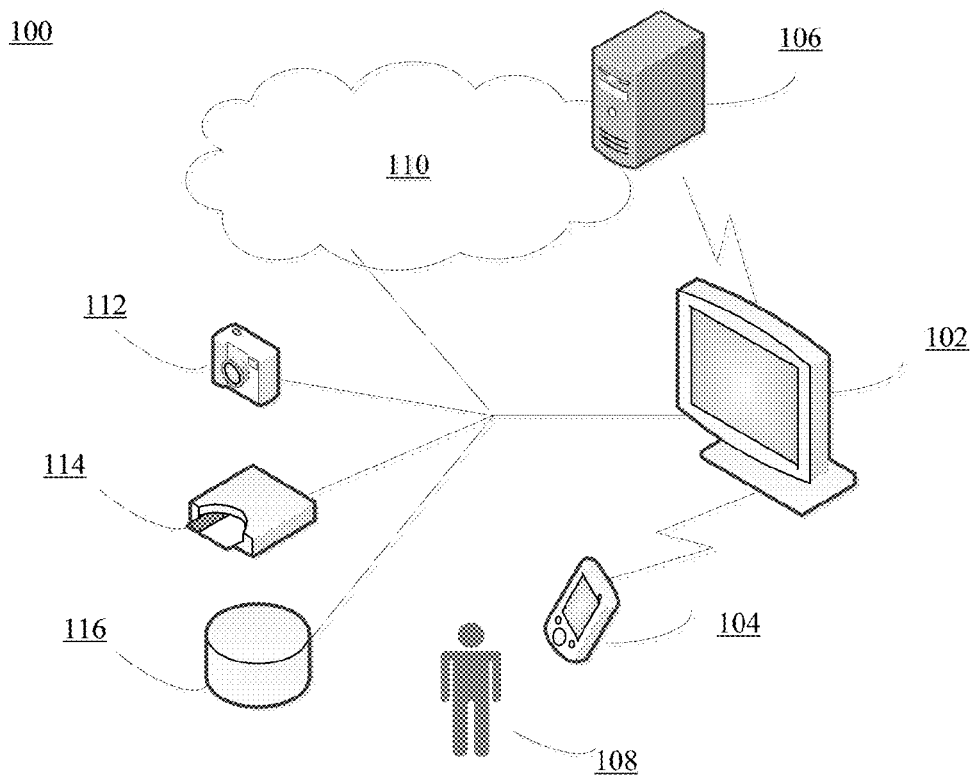
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a television set (TV) 102, a remote control 104, a server 106, a user 108, and a network 110, a camera 112, a portable storage 114, and a data storage 116. Certain devices may be omitted and other devices may be included.

TV 102 may include any appropriate type of TV, such as plasma TV, liquid crystal display (LCD) TV, projection TV, non-smart TV, or smart TV. TV 102 may also include other computing systems, such as a personal computer (PC), a tablet or mobile computer, or a smart phone, etc. Further, TV 102 may be any appropriate content-presentation device capable of presenting multiple programs in one or more channels, which may be controlled through the remote control 104.

The remote control 104 may include any appropriate type of remote control that communicates with and controls the TV 102, such as a customized TV remote control, a universal remote control, a tablet computer, a smart phone, or any other computing device capable of performing remote control functions. The remote control 104 may also include other types of devices, such as a motion-sensor based remote control, or a depth-camera enhanced remote control, as well as simple input/output devices such as a keyboard, a mouse, and a voice-activated input device, etc.

The user 108 may interact with TV 102 using remote control 104 to watch various programs and perform other activities of interest, or the user may simply use hand or body gestures to control TV 102 if motion sensor or depth-camera is used by TV 102. The user 108 may be a single user or a plurality of users, such as family members watching TV programs together.

Further, the server 106 may include any appropriate type of server computer or a plurality of server computers for providing video contents to the user 108. The server 106 may also facilitate communication, data storage, and data processing between the remote control 104 and TV 102. TV 102, remote control 104, and server 106 may communicate with each other through one or more communication networks 110, such as a cable network, a phone network, and/or a satellite network, etc.

The network 110 may include any number of communication networks and servers for providing various media for the server 106, such as streaming video, and photos and images, etc.

Camera 112 may be an internal camera in the TV 102, or the server 106 or may be an external camera connected to the TV 102 over a network or a cable. Camera 112 may provide images and videos to the TV 102. Camera 112 may also collect face images or videos for further analysis.

Portable storage 114 may include any appropriate portable storage device for storing images or videos for TV 102, such as memory card, flash disk, and other type of removable storage media. Further, the data storage 116 may be an internal or external data storage device, such as a disk or a database for storing images or videos for TV 102.

Figure 2:
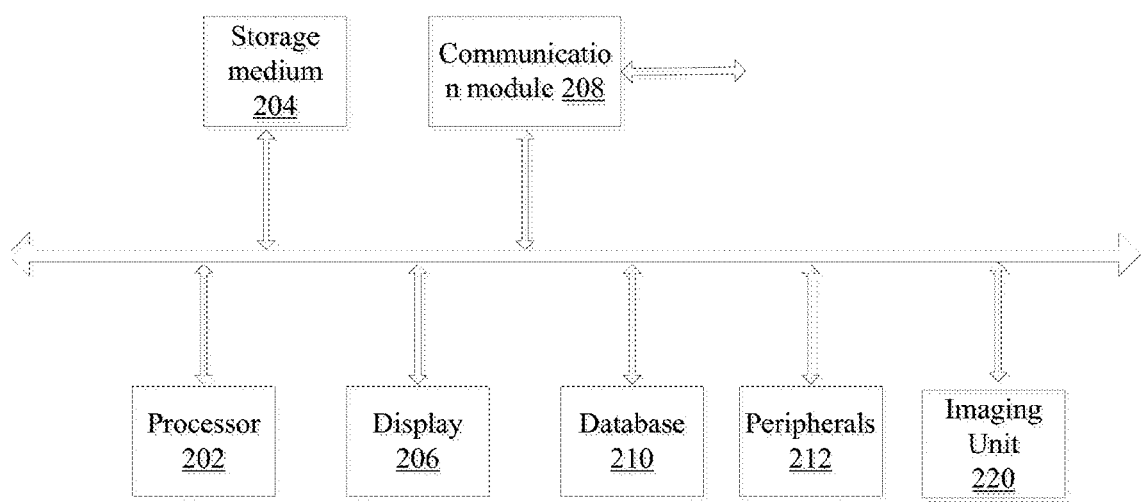
FIG. 2 illustrates an exemplary computing system consistent with the disclosed embodiments.

TV 102, remote control 104, and/or server 106 may be implemented on any appropriate computing circuitry platform. In operation, the computing circuitry platform may obtain images and/or videos from the camera 112, the portable storage 114, the data storage 116, and/or the network 110, and may perform certain image processing, such as face recognition, on the images and/or videos. FIG. 2 shows a block diagram of an exemplary computing system 200 capable of implementing TV 102, remote control 104, and/or server 106.

As shown in FIG. 2, computing system 200 may include a processor 202, a storage medium 204, a display 206, a communication module 208, a database 210, peripherals 212 and an imaging unit 220. Certain devices may be omitted and other devices may be included.

Processor 202 may include any appropriate processor or processors. Further, processor 202 can include multiple cores for multi-thread or parallel processing. Processor 202 may execute sequences of computer program instructions to perform various processes. Storage medium 204 may include memory modules, such as ROM, RAM, flash memory modules, and mass storages, such as CD-ROM and hard disk, etc. Storage medium 204 may store computer programs for implementing various processes when the computer programs are executed by processor 202, such as computer programs for implementing a face recognition process.

Further, communication module 208 may include certain network interface devices for establishing connections through communication networks. Database 210 may include one or more databases for storing certain data and for performing certain operations on the stored data, such as database searching.

Display 206 may provide information to a user or users of TV 102. Display 206 may include any appropriate type of computer display device or electronic device display (e.g., CRT or LCD based devices). Peripherals 212 may include various sensors and other PO devices, such as keyboard and mouse. Further, peripherals 212 may receive and/or send data from and/or to imaging unit 220. The imaging unit 220 may include any appropriate image capturing, storage, and/or processing components, which is couple to or coincide with the processor 202.

In operation, the computing system 200, more particularly, processor 202 and/or the imaging unit 220 may perform certain processes to process images from various sources to identify the subject of interest and to provide further processing and applications. For example, the computing system 200 may play back a video and perform face recognition on the images in the video stream.

That is, in operation, TV 102 (or server 106, remote control 104, etc.) may receive a video stream for play back and/or other video/image processing. The video stream may be from locally stored video data, video data received from other sources over the network 110, or video data inputted from camera 112 or other peripherals 212, etc.

Figure 3:
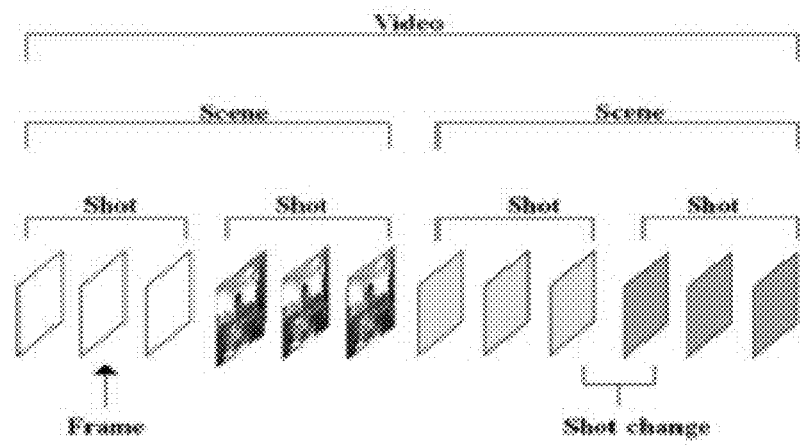
FIG. 3 illustrates a video stream being divided into different video components consistent with the disclosed embodiments.

A video stream may be divided into different video components. As shown in FIG. 3, a video stream may be divided into scenes, a scene may be divided into shots, and a shot may be divided into frames. The frame can be further divided into objects. Features of the video frame may be extracted for further processing. The face recognition may be performed on the objects to identify one or more pre-configured subject, such as a person.

Figure 4:
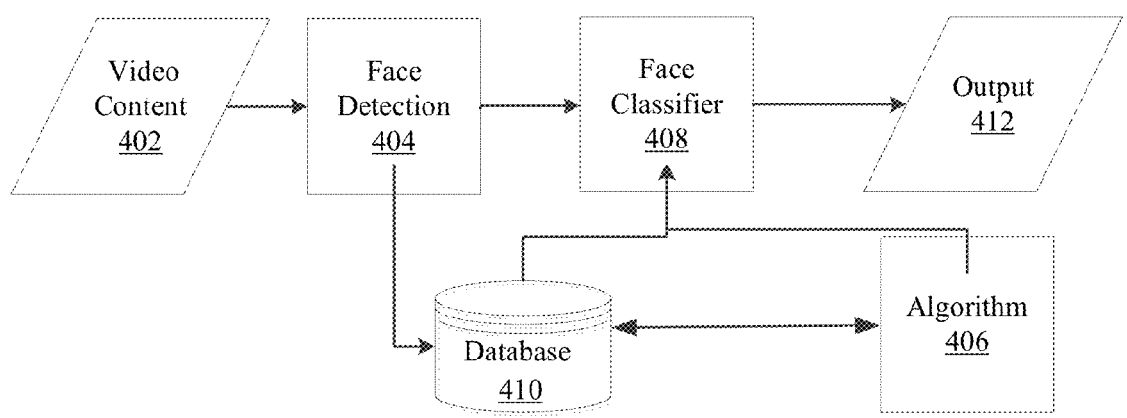
FIG. 4 illustrates a structure schematic diagram of an exemplary face recognition system consistent with the disclosed embodiments.

FIG. 4 illustrates a structure schematic diagram of an exemplary face recognition system 400 consistent with the disclosed embodiments. As shown in FIG. 4, the face recognition system 400 includes video content 402, a face detection module 404, an algorithm module 406, a face classifier 408, a database 410, and an output module 412. Certain components may be omitted and other components may be added. The system 400 (e.g., the various components) may be implemented in hardware, software, or a combination of hardware and software.

The input video or video content 402 may include any appropriate type of source for video contents and may contain various video sources. The contents from the input video 402 may include both video data and metadata. Plurality of frames may be associated with the video contents and may be provided to other modules for processing. A single picture may also be included. The input video is divided into different sets of frames.

The face detection module 404 may be configured to automatically find locations of faces in a sequence of video frames. The face detection module 404 may reside within TV 102 or outside the TV 102 depending on particular applications. The detected faces may be stored in the database 410 as training samples or be classified by the face classifier 408 as test samples.

Further, the database 410 may include any appropriate database to store face images, face features and other related data. For example, the database 410 may include an in-house or online database that has a collection of face-relevant photos and/or a collection of face images. Face images may be extracted from the face-relevant photos for further identification. The database 410 may further include extracted face features from the face images.

The database 410 may be queried to retrieve certain images. For example, in a given movie and a set of actors, each actor's (i.e., targeting actor) name and movie's name are used as key words for querying in the dictionary to retrieve a set of images. This image set may contain mostly the targeting actor's images and a few other actors' images, with each image containing one or more actors' faces.

The algorithm module 406 may be configured to employ a deep collaborative representation-based classification algorithm to process the test face samples and/or the training face samples. For example, during a training phase, the algorithm module 406 may extract face features from the face images obtained from the database 410 and store the extracted features to the database 410. For another example, during a testing phase, the algorithm module 406 may process a test sample and estimate representation vectors of the test sample using the training data from the database 410.

The face classifier 408 may be configured to perform classification through the deep collaborative representation-based classification algorithm and give a final decision of the class identity. In certain embodiments, the face classifier 408 and the algorithm module 406 may be integrated in one computation module.

The output module 412 may be configured to output identified faces. The output module 412 may output the identified faces for display to the user 108 or for other application programs for further processing. Certain modules may be merged or omitted and other modules may be included.

Figure 5:
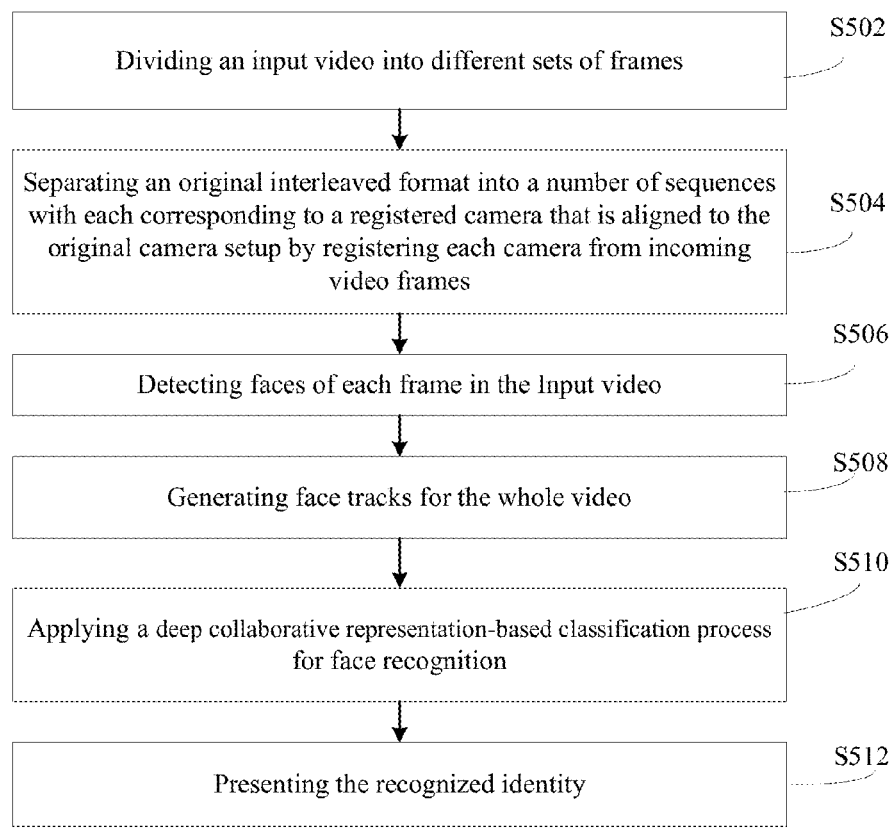
FIG. 5 illustrates a flow chart of an exemplary face recognition process consistent with the disclosed embodiments.

FIG. 5 illustrates a flow chart of an exemplary face recognition process 500 performed by the various modules in the face recognition system consistent with the disclosed embodiments.

As shown in FIG. 5, at the beginning, an input video is divided into different sets of frames (S502). Because a video is a sequence of frames and the changes between consecutive frames are relatively small due to typical frame rate for a video (e.g. 24 frames/second), instead of dealing with each frame individually, some grouping or clustering techniques may be applied to separate the whole video into different sets of frames with each set has similar frames for further processing.

After obtaining the input video sequences, the video sequence is simplified into a frame sequence corresponding to a registered camera that is aligned to the original camera setup by registering each camera from incoming video frames (S504).

A typical movie sequence is an interleaved format of a number of camera shots, and a camera take is a continuous recorded performance with a given camera setup. Camera registration, as used herein, may refer to registration of different cameras capturing video frames in a video sequence/stream. The concept of camera registration is based on the camera takes in reconstruction of video edits. A typical video sequence is an interleaved format of a number of camera shots, and a camera take is a continuous recorded performance with a given camera setup. By registering each camera from the incoming video frames, the original interleaved format can be separated into a number of sequences with each corresponding to a registered camera that is aligned to the original camera setup.

After the camera take is identified, faces of each frame in the video are detected (S506). Detecting the faces of each frame in the video can facilitate to produce face tracks before applying face recognition. That is, the face detection can be applied for each frame within each camera take. The face detection may find automatically the location of the faces in a sequence of frames.

The group of detected faces within a same camera take may be used as a face track. In this way, face tracks are generated for the whole video (S508). Specifically, a new face track is initialized by the first detected face for each camera take. For the rest frames of each camera take, if the distance between two detected faces from consecutive frames passes a pre-defined threshold, a new face track is initialized; otherwise this face is added to the current face track. The face images from each face track may be pre-processed for later classification. The pre-processing methods may include averaging the faces in one face track, performing registration to align same faces in one face track, etc.

Further, a deep collaborative representation-based classifier is applied to test face samples and perform classification (S510). After the classification is performed, the identity is presented to the user or to other application programs (S512).

For example, a video may be generated containing the recognized face images, annotations may be added to the recognized faces in the video according to the face tracks, the user may be prompted with the identity of the subject in the video, or the identity of the subject in the video may be provided to an application program and the application program may alert the user of certain events, such as to alert the user of its favorite show, or a security situation, etc.

Figure 6:
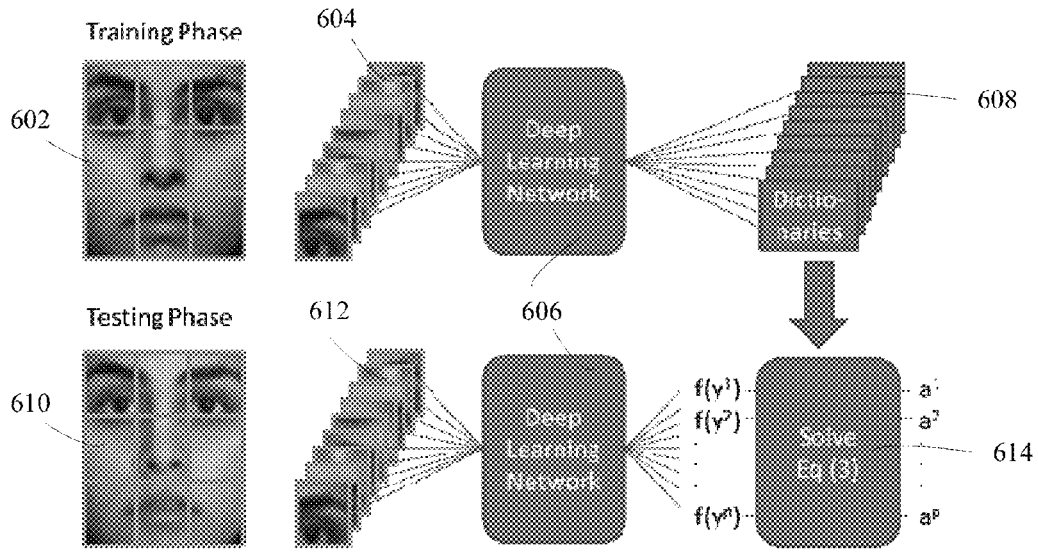
FIG. 6 illustrates a block diagram of an exemplary deep collaborative representation-based classification process consistent with the disclosed embodiments.

FIG. 6 illustrates a block diagram of an exemplary deep collaborative representation-based classification process consistent with the disclosed embodiments. In an exemplary embodiment, the deep collaborative representation-based classification process (e.g. S510) may be divided into a training phase and a testing phase. The training phase may be an offline procedure. That is, the training procedure may be completed in advance. The trained data may be stored in a database or a storage medium (e.g. the database 410) and distributed to any appropriate servers or terminals. The testing phase may be an online process, where a test face image may be recognized in real-time using provided programs and the trained data. For example, a user may upload a image or a video through a user interface (e.g. a webpage or an application on a smart phone). A server or a smart terminal corresponding to the user interface may perform face recognition procedures and provide recognized identities to the user.

During the training phase, a training dataset containing a plurality of face images 602 with known identities may be obtained. For example, the face images in the training dataset may be from C different people with $n_i$ images from each person. In some embodiments, each person may have same number of face images and $n_i$ is a fixed number, thus the training dataset contains n face images, where $n=C \times n_i$. In other embodiments, each person may have different numbers of face images and the training dataset contains n face images, where $n=\Sigma_{i=1}^{C} n_i$.

For each person, all face images from a person i may be represented by vectors. The face image vectors may be stacked into a matrix denoted as $T_i \in \mathbb{R}^{d \times n_i}$, where d is the size (width×height) of a vectorized face image. Let $T=[T_1, \ldots, T_i, \ldots, T_c] \in \mathbb{R}^{d \times n}$ denote the matrix (dictionary) containing all images from all people. The vectorized training face images may be stored and maintained in a database (e.g. the database 410).

Using representation-based classification methods, a test sample 610 (e.g. a test face image) $y \in \mathbb{R}^d$ can be represented as a linear combination of faces from the training set by the following equation (1).

$$y=Ta+e \quad (1)$$

In equation (1), $a \in \mathbb{R}^n$ is a representation vector and $e \in \mathbb{R}^d$ denotes the residual error. The coefficients of a can be estimated by solving an optimization problem (2), where Q(a) is a regularizer.

$$a^* = \operatorname*{argmin}_{a} \|y - Ta\|_2^2 + \lambda Q(a) \quad (2)$$

Further, the classification or identification of the subject is performed by selecting a face class that yields the minimum reconstruction error, $e_i(y)=\|y-T_i a^*_i\|_2$, where $a^*_i$ is the segment of vector a associated with class i and $T_i$ is a corresponding sub-matrix of T. Finally, the identity of y is given by Identity(y)=$\operatorname{argmin}_i \{e_i\}$.

In prior art, sparse representation based classification (SRC) may be used. Because the representation vector is assumed to be sparse, the regularizer Q(a) may use $l_1$-norm $\|a\|_1$. However, $l_1$ optimization methods are not necessary for improving face recognition performance.

Instead of relying on the effect of the $l_1$ regularized coefficients, the present disclosure implements collaborative representation of one image using multiple similar images to improve face recognition performance. For example, one image may be divided into multiple blocks. In certain embodiments, the optimization problem in (2) may be approached by solving a regularized least squares problem $Q(a)=\|a\|_2^2$, which can be easily solved in closed form.

Face recognition with non-frontal views may be approached with deep learning methods. Deep convolutional neural networks (ConvNets) may extract better representations and more invariant visual features.

In the disclosed embodiments, a deep collaborative representation method is implemented. During the training phase, each training face image 602 may be partitioned into non-overlapping blocks 604. A deep learning network 606 may be applied to extract pre-trained deep features from each block 604. The extracted features of each block from each face image may be stored in dictionaries 608. For example, when each face image is partitioned into p blocks, p dictionaries may be constructed for each face image after deep feature extraction.

Similarly, during the testing phase, a face test sample 610 may be partitioned into non-overlapping blocks 612 (e.g. p blocks). Deep features may be extracted from the blocks using the deep learning network 606. Each block may correspond to one feature matrix stacked with feature vectors obtained from all training face image blocks at the same location. For example, the feature matrix for a block r may be denoted as $F(T^r)$.

Further, each feature vector of the test face sample may be represented as a combination of extracted features from the dictionaries 608. For example, a representation vector $a^r$ may be obtained for the feature vector $f(y^r)$ of block r in the test sample. The representation vector may be considered as a coefficient vector of the training feature matrix. The feature vector $f(y^r)$ of the test sample may be estimated by combining the representation vector and the training feature matrix (e.g. $F(T^r)a^r$).

For the p blocks of the test sample 610, p representation vectors may be estimated by solving a relaxed collaborative representation (RCR) problem or a collaborative representation classification with regularized least square (CRC-RLS) problem 614. Finally, the identity of the test sample is determined by finding the representation with minimum residual errors (not shown in FIG. 6).

The representation vectors a obtained from each block over their associated sub-dictionaries are assumed to be similar, as each block is most likely to be represented as a linear combination of faces from the same person. This similarity may be exploited over pixel intensities or other feature modalities. In the disclosed embodiments, the representation vectors obtained by the deep features and their associated dictionaries may also share some similarity.

Figure 7:
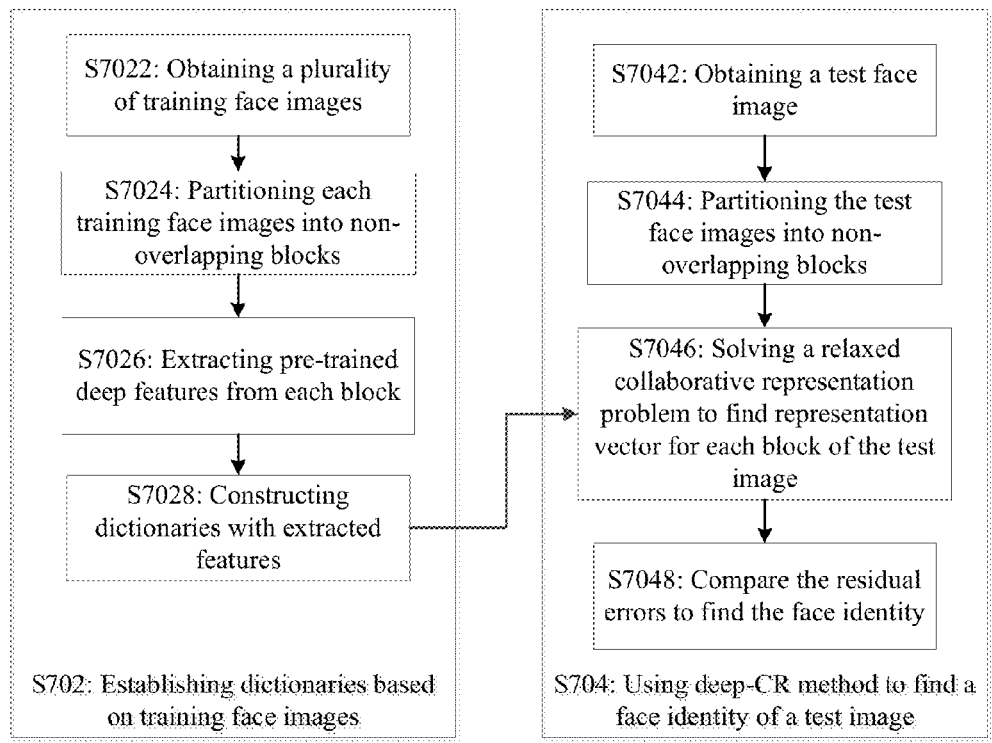
FIG. 7 illustrates a flow chart of an exemplary deep collaborative representation-based classification process consistent with the disclosed embodiments.

FIG. 7 illustrates a flow chart of an exemplary deep collaborative representation-based classification process consistent with the disclosed embodiments. In an exemplary embodiment, the process 700 (e.g. S510) may include establishing dictionaries using a plurality of training face images (S702) during a training phase, and using deep collaborative representation-based method to find a face identity of a test image (S704) during a testing phase.

In the training phase (S702), a training dataset containing a plurality of face images with known identities may be obtained (S7022). The face images in the training dataset may be from C different people (i.e. C face classes) with $n_i$ images from each person. The total number of face images in the training dataset may be denoted as n. In some embodiments, each person may have same number of face images and $n_i$ is a fixed number, thus the training dataset contains n face images, where $n=C \times n_i$. In other embodiments, each person may have different numbers of face images and the training dataset contains n face images, where $n=\Sigma_{i=1}^{c} n_i$.

Further, each training face image may be partitioned into a plurality of non-overlapping blocks (S7024). For example, a face image may be partitioned into p blocks. The face image may be divided into m rows and k columns, thus total number of blocks from each face image is m×k=p.

Further, deep features are extracted from each block using a deep learning network (S7026). In certain embodiments, a framework of convolutional neural networks may be used to extract deep features. Further, a convolutional architecture for fast feature embedding (Caffe) framework may be employed. Caffe may provide a complete toolkit for training, testing, fine-tuning, and deploying deep learning models and support GPU (graphics processing unit) computation. In certain embodiments, the convolutional neural network may include five convolutional layers, max-pooling layers and two fully connected layers. A 4096-dimensional feature vector may be extracted from one block in a face image. The computation may be accelerated using GPU computation. In one embodiment, it may take about 8 ms for calculating one feature vector. Further, the network may be fine tuned using tested face as training faces. It should be noted that when there is a small number of tested face images, over-fitting may occur and accuracy may be decreased.

The extracted feature vectors from all training images may be stacked into training dictionaries (S7028). Each block location may correspond to one dictionary. The training dictionary of a $r^{th}$ block may be denoted as $T^r$, where r=1, . . . , p. F(•) may denote the deep features extracted from multiple input blocks (i.e. blocks in training face images), which are stacked into a matrix. The deep feature dictionary matrix of the $r^{th}$ block of the training faces is therefore calculated as $F(T^r) \in \mathbb{R}^{z \times n}$. Further, when there are C different people in the training dataset, for the $i^{th}$ set of samples corresponding to the $i^{th}$ person, the deep feature vector for the $r^{th}$ block is a submatrix of $T^r$ and may be denoted as $T_i^r$, where i=1, . . . , C.

In the testing phase (S704), a test face image may be obtained (S7042). The test image may be denoted as $y \in \mathbb{R}^d$. The test face image may also be partitioned into p non-overlapping blocks (S7044). The $r^{th}$ block of the test face image may be denoted as $y^r$.

In certain embodiments, having extracted deep features and constructed the dictionaries for each block (S702), during the testing phase, the representation vector $a^r$ for the $r^{th}$ block of the test image may be obtained (S7046) by solving the relaxed collaborative representation (RCR) problem (3), $$a^{*r}, w^{*r} = \underset{a^r, w^r}{\operatorname{argmin}} \sum_{r=1}^{p} \|f(y^r) - F(T^r)a^r\|_2^2 + \lambda_1 \|a^r\|_2^2 + \lambda_2 w^r \|a^r - \bar{a}\|_2^2 + \gamma w^r \ln w^r \quad (3)$$

where $a^r$ is the representation vector of the $r^{th}$ deep feature vector $f(y^r)$ over the $r^{th}$ dictionary $F(T^r)$, $\bar{a}$ is the mean vector of all representation vectors $a^r$, and $\lambda_1 > 0$, $\lambda_2 > 0$ and $y > 0$ are Lagrange multipliers. $a^{*r}$ denotes a resultant representation vector of the $r^{th}$ block.

A weight $w^r$ is assigned to each representation vector $a^r$. $w^{*r}$ denotes a weight corresponds to the resultant representation vector $a^{*r}$. The mean vector $\bar{a}$ may be calculated by $\Sigma_r w^r a^r / \Sigma_r w^r$. The similarity between the representation vectors is exploited by the regularizer $\lambda_2 w^r \|a^r - \bar{a}\|_2^2$, which forces the representation vectors to be similar by minimizing the deviation from their mean $\bar{a}$. The last term in equation (3) may function as an outlier detector. The value of the weight $w^r$ is regularized according to the entropy $y w^r \ln w^r$, which leads to smaller weights for outliers, whose representation vectors significantly deviate from the mean $\bar{a}$. The problem in (3) may be solved in an alternating fashion between $a^r$ and $w^r$, by solving a regularized least squares problem for the coefficients $a^r$ having the weights $w^r$ and $\bar{a}$ fixed, and updating $w^r$ and $\bar{a}$ by fixing $a^r$.

In some embodiments, representation vectors for each block can also be obtained (S7046) by solving a collaborative representation classification with regularized least square (CRC-RLS) problem in Equation (2) with $Q(a)=\|a\|_2^2$. The CRC-RLS is a special case of the problem in (3) by setting $\lambda_2=0$.

After obtaining representation vectors $a^{*r}$ for blocks in the test face image, the residuals for each person may be computed (S7048). Each person in the training dataset is considered as a class. The residual for each class i may be computed as, $$e_i(y) = \Sigma_{r=1}^{p} w^{*r} \|f(y^r) - F(T_i^r) a^*_i{}^r\|_2^2 \quad (4)$$

where $a^*_i{}^r$ is the segment of $a^{*r}$ associated with class i and $T_i^r$ the corresponding submatrix of $T^r$. Further, the class with the minimum residual error indicates the classification result. That is, the identity of y is given as, Identity(y) $= \operatorname{argmin}_i \{e_i\}$.

Figure 8A:
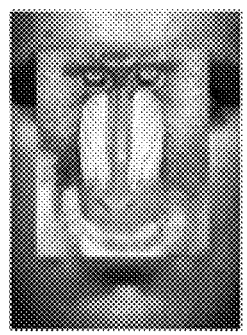
FIG. 8A illustrates a test image used in an exemplary face recognition process consistent with the disclosed embodiments.

FIG. 8A illustrates a test image used in an exemplary face recognition experiment consistent with the disclosed embodiments. The test image has 50% occlusion. The training dataset contains face images from 38 different people. The test face image belongs to the 4th person in the training dataset. The experiment compares face recognition results between a relaxed collaborative representation classifier using pixel intensities (Block-RCR) in prior art and a classifier using similar approach with deep features (Deep-RCR) consistent with the disclosed embodiments.

Figure 8B:
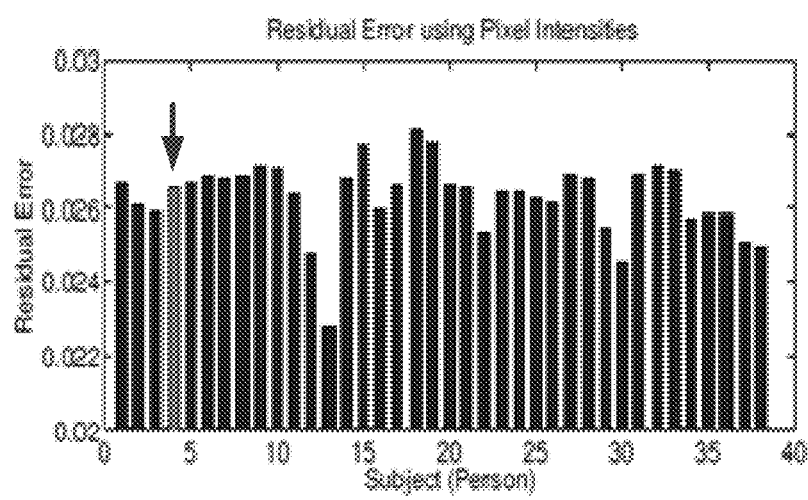
FIG. 8B illustrates face recognition result of the test image by a classifier using pixel intensities in prior art.
Figure 8C:
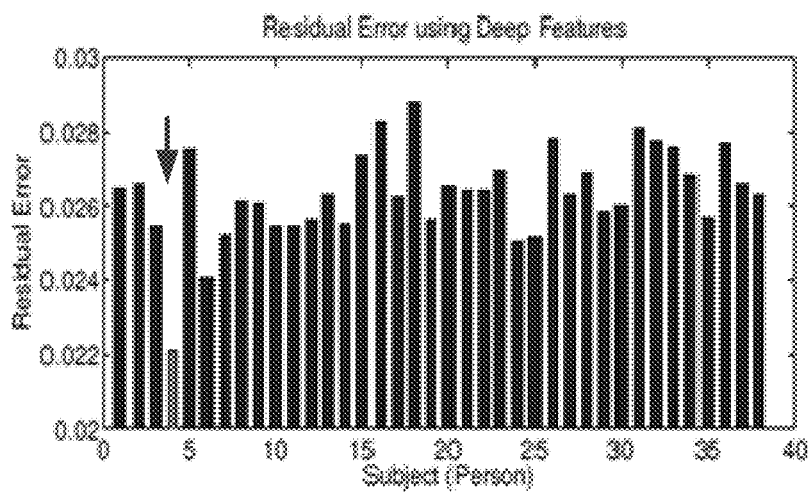
FIG. 8C illustrates face recognition result of the test image by a classifier using deep features consistent with the disclosed embodiments.

FIG. 8B illustrates face recognition result of the test image by the classifier using pixel intensities in prior art. FIG. 8C illustrates face recognition result of the test image by the classifier using deep features consistent with the disclosed embodiments. In both figures, x-axis indicates the pool of subjects (i.e. persons), and y-axis indicate the residual error. Each bar shows the residual error $e_i(y)$ for the $i^{th}$ person obtained from equation (4). The arrows indicate the correct person.

As shown in FIGS. 8B and 8C, the classifier using pixel intensities (Block-RCR) fails to recognize the correct person ($13^{th}$ person has the minimum residual error instead) whereas the same approach with deep features (Deep-RCR) is still able to classify the image correctly ($4^{th}$ person has the minimum residual error).

The disclosed embodiments provide an approach to obtain desired face recognition results by combining collaborative representation-based classification with deep features. Experiment results suggest that deep features are more accurate than pixel intensities, because they are more robust towards image distortions. Deep features may also demonstrate desired performance in a multiblock approach, under the circumstance that just a small part of the face is visible in a block. The disclosed embodiments may be applied across a multitude of databases.

Figure 9:
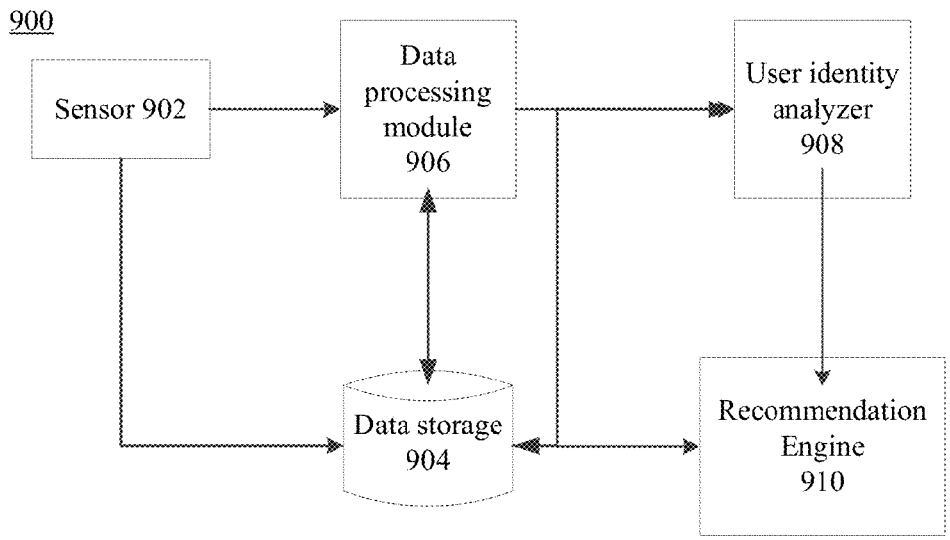
FIG. 9 illustrates another exemplary face recognition system consistent with the disclosed embodiments.

FIG. 9 illustrates another exemplary face recognition system consistent with the disclosed embodiments. As shown in FIG. 9, the face recognition system 900 may include a sensor 902, a data storage 904, a data processing module 906 and a user identity analyzer 908. Certain components may be omitted and other components may be added.

The sensor 902 may be any physical or virtual device capable of capturing images for further processing. For example, the sensor 902 may include physical sensors such as the digital camera 112, the TV 102 with built-in camera, the remote control 104 with built-in camera, and virtual sensors such as the network 110, the portable storage 114, and the data storage 116. The acquired data from the sensors may include any graphical representations of faces, such as images and videos. The sensor 902 may include a plurality of sensors for obtaining a variety of sensing data. The acquired data from the sensor 902 may be stored in the data storage 904.

The data storage 904 may store acquired data from the sensor 902, training dataset, user activities, user preferences and recommendation contents according to user identities. The training dataset may include training face images or videos, and dictionaries containing pre-trained deep features obtained from the training phase (e.g. S702).

Further, the face recognition system 900 may include a recommendation engine 910. The data processing module 906, user identity analyzer 908, and the recommendation engine 910 are configured to perform various processing based on the data from the sensor 902 and data storage 904. For example, the sensing data processing module 906 may pre-process the images or videos from the sensor 302 and extract face samples for further identification. The data processing module 906 may also pre-process user identity information, such as pre-stored user face samples in the data storage 904 (e.g. S702).

The user identity analyzer 908 may use the processed data to determine a current user based on the training face samples and the data acquired from the sensor 902 and processed in the processing module 906. The user identity analyzer 908 may employ the deep collaborative representation-based classification process 700 to determine the user identity (e.g. S704).

In operation, a current user 108 may be holding the remote control 104, sitting in front of the TV 102 or using a smart phone. That is the sensor 902 is activated to collect user data. The face images collected from the same subject may be captured under different conditions (e.g., poses, lighting conditions, occlusions etc). The data processing module 906 may extract the face test samples for further processing. The user identity analyzer 908 may classify and determine the current user identity according to the training data from the data storage 904. The recommendation engine 910 may recommend personalized contents to the user according to the user's identity, such as TV channels, news websites, online videos and shopping guides according to the user's interests.

Figure 10:
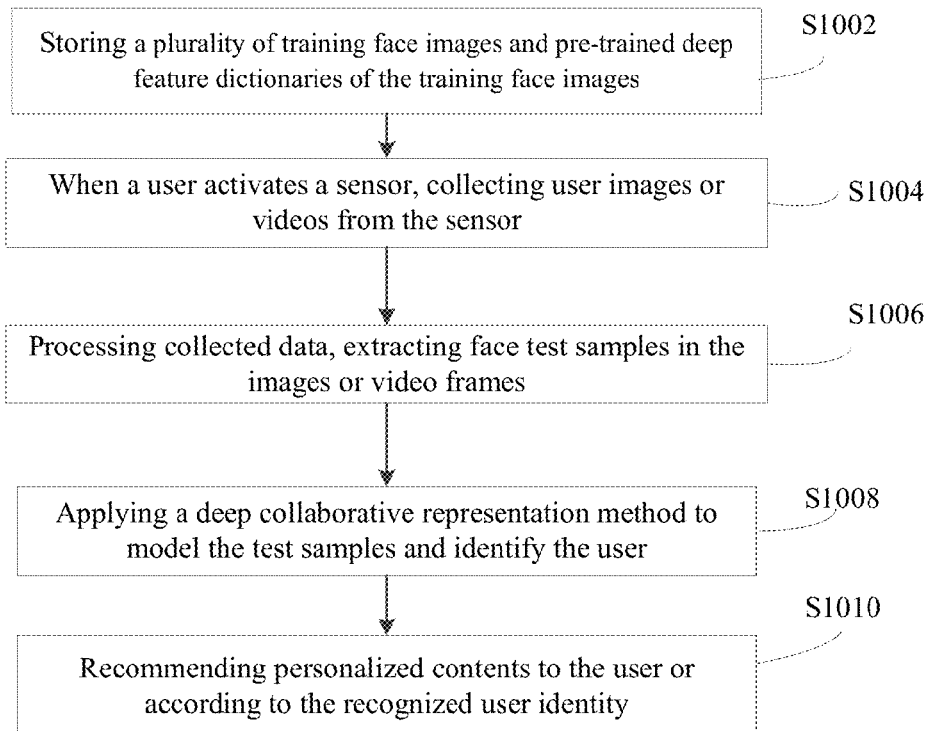
FIG. 10 illustrates another exemplary face recognition process consistent with the disclosed embodiments.

FIG. 10 illustrates another exemplary face recognition process consistent with the disclosed embodiments. As shown in FIG. 10, the face recognition process 1000 first stores a pluratliy of training face images (S1002). Each training face image corresponds to a face class, and each face class may include one or more training face images. A face class may represent one person or one object as an identification. For example, the training face images may belong to 10 different persons, and thus there are 10 face classes. Each face class may include more than one training face images for the same person or object. For example, one face class may have 5 training face images. In addition, each face class may relate to a user and corresponding personalized information of the user. Further, pre-trained deep feature dictionaries of the training face images may also be stored (e.g. S702). When a user activates a sensor, the process 1000 then collects images or videos from the sensor (S1004). For example, when a user approaches a remote control with built-in camera. The camera may capture the user's face images. The collected data are then processed to extract face test samples in the images or video frames (S1006). Following, a collaborative representation model may be applied to the face test samples and identify the user (S1008). This process may employ deep collaborative representation-based classification process 700 to determine the user identity. After the user identity is determined, the user may be prompted with recommended personalized contents (S1010).

By using the disclosed systems and methods, many advantageous applications can be implemented. The face recognition techniques may be applied to the video domain where faces of key persons in a video can be automatically detected and recognized to facilitate various multimedia management tasks, such as news video summarization, retrieval and browsing.

It is understood that the disclosed face recognition model is not limited to TV usage scenario. The disclosed systems and methods can also be applied to any devices with displays, such as smart phones, tablets, PCs, smart watches, and so on. The disclosed methods can also be applied as the core function for other systems, such as content-based video recommendation systems, content-based video retrieval systems, and so on.

It should be noted that the disclosed face recognition method and system do not limit to human faces. The disclosed embodiments may also apply to animal faces or other objects (e.g. flowers).

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A face recognition method on a computing device, comprising:
    obtaining a plurality of training face images which belongs to a plurality of face classes, wherein a face class includes one or more training face images and represents an identification of the one or more training face images;
    obtaining a plurality of training dictionaries corresponding to the plurality of training face images, wherein the plurality of training dictionaries include a plurality of deep feature matrices;
    obtaining an input face image;
    partitioning the input face image into a plurality of blocks;
    extracting corresponding deep feature vectors of the plurality of blocks of the input face image using a deep learning network;
    applying a collaborative representation model to represent the deep feature vectors of the blocks of the input face image with the training dictionaries and representation vectors;
    computing residual errors for the face classes, a residual error for a face class being a summation of errors for all blocks corresponding to the training face images in the face class, wherein an error for a block exists between a feature vector of the block in the input face image and the collaborative representation model of the block corresponding to the face class;
    classifying the input face image by selecting a face class that yields a minimum residual error as a recognition face class; and
    presenting the recognition face class of the input face image.

2. The face recognition method according to claim 1, wherein:
    the training face images are partitioned into a plurality of non-overlapping blocks;
    a deep feature matrix is extracted from blocks at a same location in the training face images using the deep learning network; and
    the plurality of blocks of the input face image are non-overlapping.

3. The face recognition method according to claim 1, wherein:
    the deep learning network is a convolutional neural network; and
    the convolutional neural network includes at least five convolutional layers, max-pooling layers and two fully connected layers.

4. The face recognition face recognition method according to claim 1, wherein:
    obtaining an input face image further includes:
        dividing an input video into different sets of frames;
        detecting faces of each frame in the input video;
        generating face tracks for the whole video, a face track being a group of detected faces within a same camera take; and
        obtaining detected faces and face tracks information, wherein the input face image is obtained from the detected faces; and
    presenting the face class of the input face image further includes outputting a video by adding annotations about the face classes of the detected faces in the input video according to the face tracks.

5. The face recognition method according to claim 1, further comprising:
    storing user preference information along with the training dictionaries corresponding to one or more users; and
    after obtaining the face class of the input face image, recommending personalized contents to a user corresponding to the face class according to the user preference information.

6. The face recognition method according to claim 1, wherein:
    provided that T denotes the training face images, y denotes the input face image, the training face images and the test face image are partitioned into p blocks, F(•) denotes deep features extracted from blocks in training face images, $F(T^r)$ denotes the deep feature matrix of a $r^{th}$ block in the training face images, $F(T_i^r)$ is a submatrix of $F(T^r)$ and denotes the deep feature for the $r^{th}$ block in a $i^{th}$ face class, $f(y^r)$ denotes the deep feature vector of the $r^{th}$ block from the input face image, a*r denotes a resultant representation vector of the $r^{th}$ block obtained from the collaborative representation model, $w^{*r}$ denotes a weight corresponds to the resultant representation vector $a^{*r}$, $a^{*r}_i$ denotes a segment of a resultant representation vector $a^{*r}$ associated with class i, and $e_i(y)$ denotes the residual error for the class i,
    the residual for the face class i is computed as $e_i(y)=\Sigma_{r=1}^{P} w^{*r}|f(y^r)-F(T_i^r)a^{*r}_i\|_2^2$; and
    the identity of y is given as, Identity(y)=$\text{argmin}_i\{e_i\}$.

7. The face recognition method according to claim 1, wherein
    provided that T denotes the training face images, y denotes the input face image, the training face images and the test face image are partitioned into p blocks, F(®) denotes deep features extracted from blocks in training face images, $F(T^r)$ denotes the deep feature matrix of a $r^{th}$ block in the training face images, $f(y^r)$ denotes the deep feature vector of the $r^{th}$ block from the input face image, $a^r$ denotes a representation vector of the $r^{th}$ block, and $a^{*r}$ denotes a resultant representation vector of the $r^{th}$ block,
    the representation vector is obtained by solving a relaxed collaborative representation problem $$a^{*r}, w^{*r} = \underset{a^r, w^r}{\text{argmin}} \sum_{r=1}^{P} \|f(y^r) - F(T^r)a^r\|_2^2 + \lambda_1 \|a^r\|_2^2 + \lambda_2 w^r \|a^r - \bar{a}\|_2^2 + \gamma w^r \ln w^r$$

wherein:
    a weight $w^r$ is assigned to each representation vector $a^r$ and $w^{*r}$ corresponds to the representation vector $a^{*r}$;
    $\bar{a}$ is a mean vector of all representation vectors $a^r$;
    $\lambda_1>0$, $\lambda_2>0$ and y>0 are Lagrange multipliers;
    $\lambda_2 w^r \|a^r-\bar{a}\|_2^2$ is a regularizer for $a^r$; and
    an entropy term $yw^r \ln w^r$ regularizes the weight $w^r$.

8. The face recognition method according to claim 7, wherein the relaxed collaborative representation problem is solved in an alternating fashion between $a^r$ and $w^r$, by solving a regularized least squares problem for the coefficients $a^r$ having the weights $w^r$ and $\bar{a}$ fixed, and updating $w^r$ and $\bar{a}$ by fixing $a^r$.

9. The face recognition method according to claim 1, wherein provided that T denotes the training face images, y denotes the input face image, the training face images and the test face image are partitioned into p blocks, F(•) denotes deep features extracted from blocks in training face images, $F(T^r)$ denotes the deep feature matrix of a $r^{th}$ block in the training face images, $f(y^r)$ denotes the deep feature vector of the $r^{th}$ block from the input face image, $a^r$ denotes a representation vector of the $r^{th}$ block, and $a^{*r}$ denotes a resultant representation vector of the $r^{th}$ block, the representation vector is obtained by solving a collaborative representation problem with regularized least square $$a^{*r}, w^{*r} = \underset{a^r, w^r}{\arg\min} \sum_{r=1}^{p} \|f(y^r) - F(T^r)a^r\|_2^2 + \lambda_1 \|a^r\|_2^2 + \lambda_1 \|\bar{a}^r\|_2^2 + \gamma w^r \ln w^r$$

wherein:
a weight $w^r$ is assigned to each representation vector $a^r$, and $w^{*r}$ corresponds to the representation vector $a^{*r}$;
$\lambda_1 > 0$ and $y > 0$ are Lagrange multipliers; and
an entropy term $yw^r \ln w^r$ regularizes the weight $w^r$.

10. A face recognition system based on a computing device, comprising:
a storage module configured to store a plurality of training face images which belongs to a plurality of face classes, wherein a face class includes one or more training face images and represents an identification of the one or more training face images, and to store a plurality of training dictionaries corresponding to the plurality of training face images, wherein the plurality of training dictionaries include a plurality of deep feature matrices;
an acquisition module configured to obtain an input face image;
a computation module configured to:
partition the input face image into a plurality of blocks;
extract corresponding deep feature vectors of the plurality of blocks of the input face image using a deep learning network;
apply a collaborative representation model to represent the deep feature vectors of the blocks of the input face image with the training dictionaries and representation vectors;
compute residual errors for the face classes, a residual error for a face class being a summation of errors for all blocks corresponding to the training face images in the face class, wherein an error for a block exists between a feature vector of the block in the input face image and the collaborative representation model of the block corresponding to the face class; and
classify the input face image by selecting a face class that yields a minimum residual error as a recognition face class; and
an output module configured to present the recognition face class of the input face image.

11. The face recognition system according to claim 10, wherein:
the training face images are partitioned into a plurality of non-overlapping blocks;
a deep feature matrix is extracted from blocks at a same location in the training face images using the deep learning network; and
the plurality of blocks of the input face image are non-overlapping.

12. The face recognition system according to claim 10, wherein:
the deep learning network is a convolutional neural network; and
the convolutional neural network includes at least five convolutional layers, max-pooling layers and two fully connected layers.

13. The face recognition system according to claim 10, wherein:
the acquisition module is further configured to:
divide an input video into different sets of frames;
detect faces of each frame in the input video;
generate face tracks for the whole video, a face track being a group of detected faces within a same camera take; and
obtain detected faces and face track information, wherein the input face image is obtained from the detected faces; and
the output module is further configured to output a video by adding annotations about the face class of the detected faces in the input video according to the face tracks.

14. The face recognition system according to claim 10, wherein:
the storage module is further configured to store user preference information along with the training dictionaries corresponding to one or more users; and
the output module is further configured to recommend personalized contents to a user corresponding to the face class according to the user preference information.

15. The face recognition system according to claim 10, wherein:
provided that T denotes the training face images, y denotes the input face image, the training face images and the test face image are partitioned into p blocks, F(•) denotes deep features extracted from blocks in training face images, $F(T^r)$ denotes the deep feature matrix of a $r^{th}$ block in the training face images, $F(T_i^r)$ is a submatrix of $F(T^r)$ and denotes the deep feature for the $r^{th}$ block in a $i^{th}$ face class, $f(y^r)$ denotes the deep feature vector of the $r^{th}$ block from the input face image, $a^{*r}$ denotes a resultant representation vector of the $r^{th}$ block obtained from the collaborative representation model, $w^{*r}$ denotes a weight corresponds to the resultant representation vector $a^{*r}$, $a^{*r}_i$ denotes a segment of a resultant representation vector $a^{*r}$ associated with class i, and $e_i(y)$ denotes the residual error for the class i,
the residual for each class i is computed as $e_i(y)\Sigma_{r=1}^{P} w^r \|f(y^r) - F(T_i^r)a^{*r}_i\|_2^2$;
and
the identity of y is given as, Identity(y)=$\arg\min_i \{e_i\}$.

16. The face recognition system according to claim 10, wherein:
provided that T denotes the training face images, y denotes the input face image, the training face images and the test face image are partitioned into p blocks, F(•) denotes deep features extracted from blocks in training face images, F(T^r) denotes the deep feature matrix of a r^{th} block in the training face images, f(y^r) denotes the deep feature vector of the r^{th} block from the input face image, a^r denotes a representation vector of the r^{th} block, and a*^r denotes a resultant representation vector of the r^{th} block, the representation vector is obtained by solving a relaxed collaborative representation problem $$a^{*r}, w^{*r} = \underset{a^r, w^r}{\arg\min} \sum_{r=1}^{p} \|f(y^r) - F(T^r)a^r\|_2^2 + \lambda_1 \|a^r\|_2^2 + \lambda_2 w^r \|a^r - \bar{a}\|_2^2 + \gamma w^r \ln w^r$$

wherein:
- a weight $w^r$ is assigned to each representation vector $a^r$ and $w^{*r}$ corresponds to the representation vector $a^{*r}$;
- $\bar{a}$ is a mean vector of all representation vectors $a^r$;
- $\lambda_1 > 0$, $\lambda_2 > 0$ and $y > 0$ are Lagrange multipliers;
- $\lambda_2 w^r \|a^r - \bar{a}\|_2^2$ is a regularizer for $a^r$; and
- an entropy term $y w^r \ln w^r$ regularizes the weight $w^r$.

17. The face recognition system according to claim 16, wherein the relaxed collaborative representation problem is solved in an alternating fashion between $a^r$ and $w^r$, by solving a regularized least squares problem for the coefficients $a^r$ having the weights $w^r$ and $\bar{a}$ fixed, and updating $w^r$ and $\bar{a}$ by fixing $a^r$.

18. The face recognition system according to claim 10, wherein:

provided that T denotes the training face images, y denotes the input face image, the training face images and the test face image are partitioned into p blocks, F(•) denotes deep features extracted from blocks in training face images, F(T^r) denotes the deep feature matrix of a r^{th} block in the training face images, f(y^r) denotes the deep feature vector of the r^{th} block from the input face image, a^r denotes a representation vector of the r^{th} block, and a*^r denotes a resultant representation vector of the r^{th} block, the representation vector is obtained by solving a collaborative representation problem with regularized least square $$a^{*r}, w^{*r} = \underset{a^r, w^r}{\arg\min} \sum_{r=1}^{p} \|f(y^r) - F(T^r)a^r\|_2^2 + \lambda_1 \|a^r\|_2^2 + + \gamma w^r \ln w^r$$

wherein:
- a weight $w^r$ is assigned to each representation vector $a^r$, and $w^{*r}$ corresponds to the representation vector $a^{*r}$;
- $\lambda_1 > 0$ and $y > 0$ are Lagrange multipliers; and
- an entropy term $y w^r \ln w^r$ regularizes the weight $w^r$.

\* \* \* \* \*